May 31, 1955  A. A. DICKE  2,709,511
CARRIAGE TRAVERSING MECHANISM FOR CALCULATING MACHINES
Filed March 22, 1951.  6 Sheets-Sheet 5
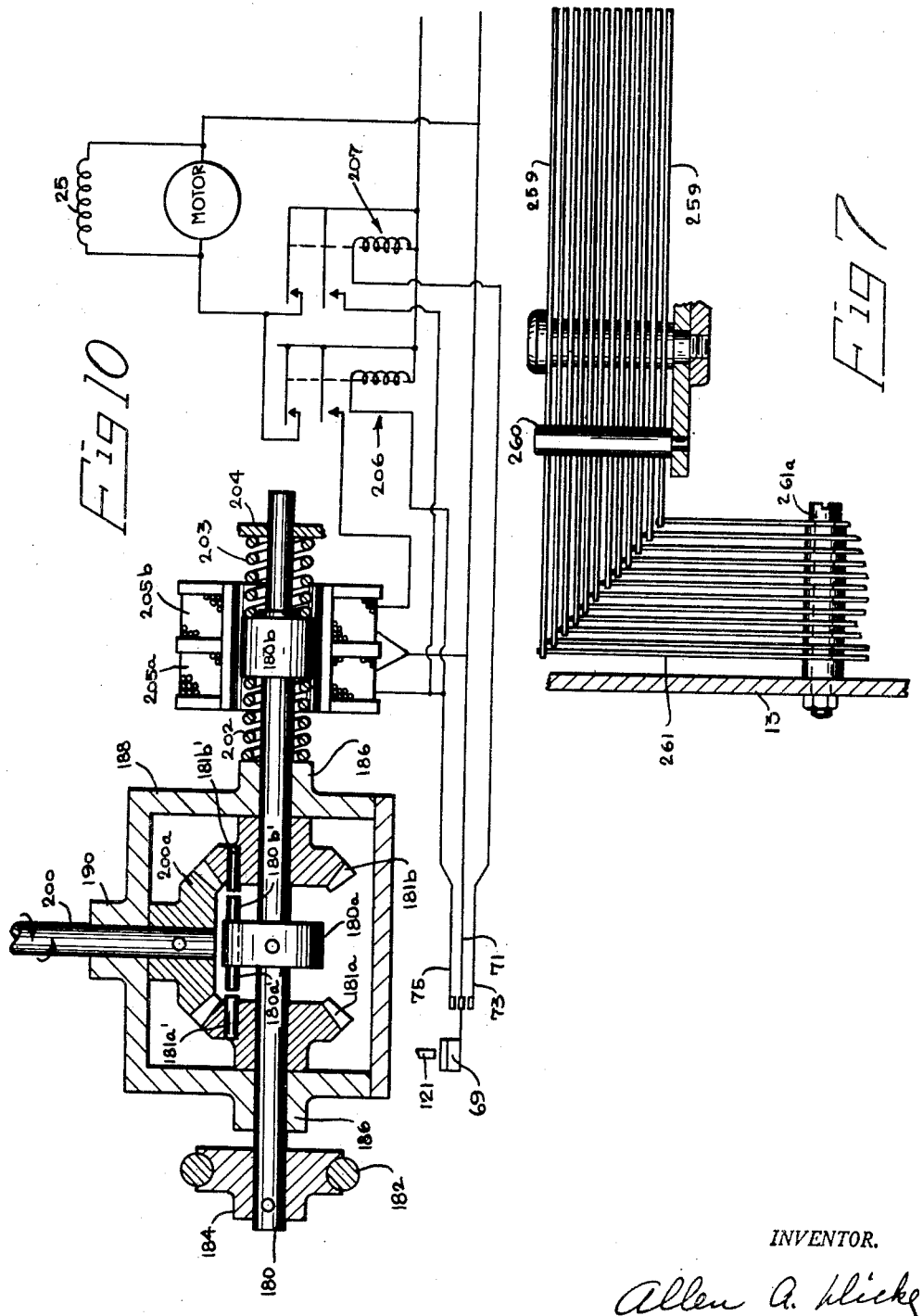
INVENTOR.
Allen A. Dicke

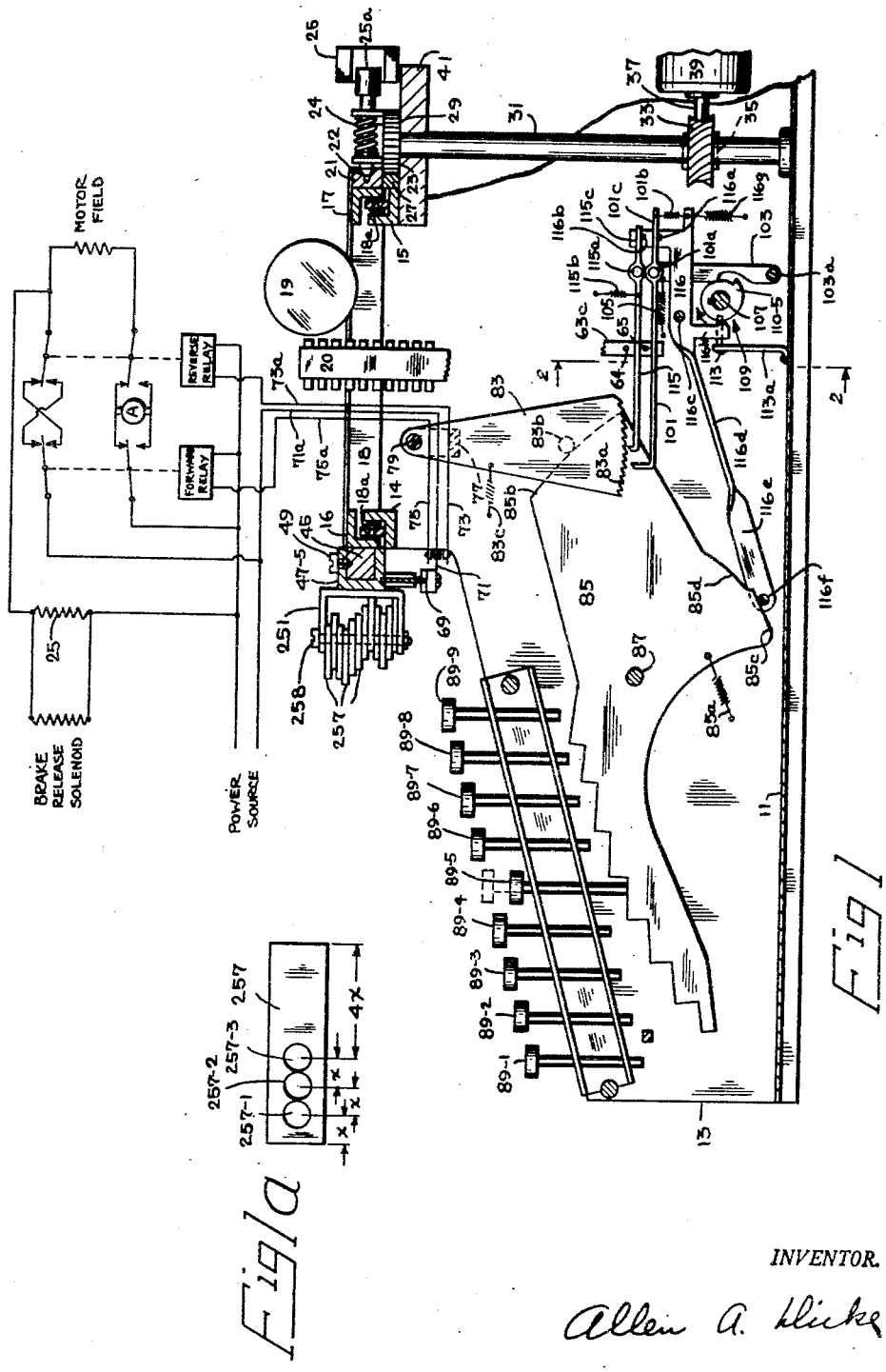

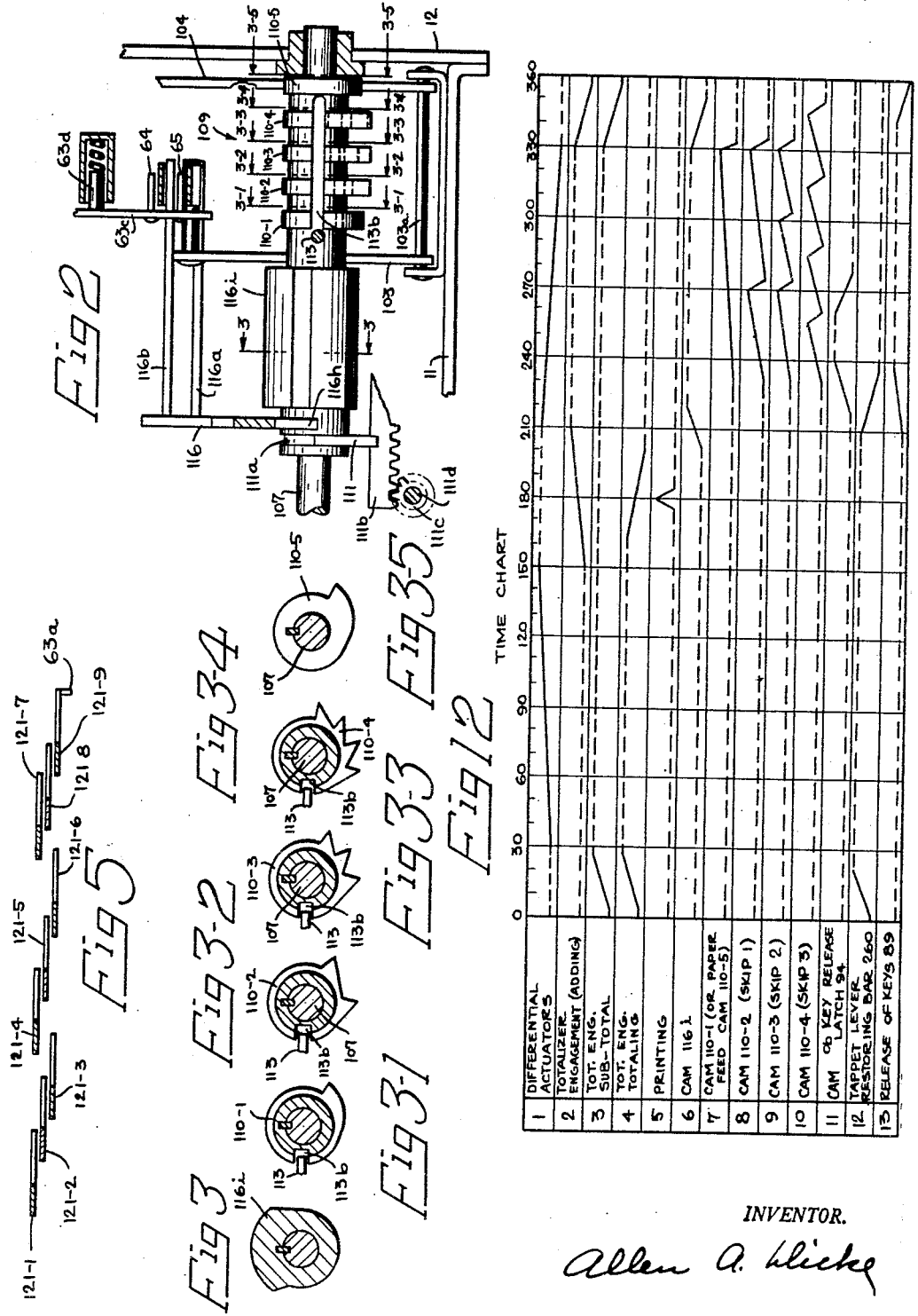

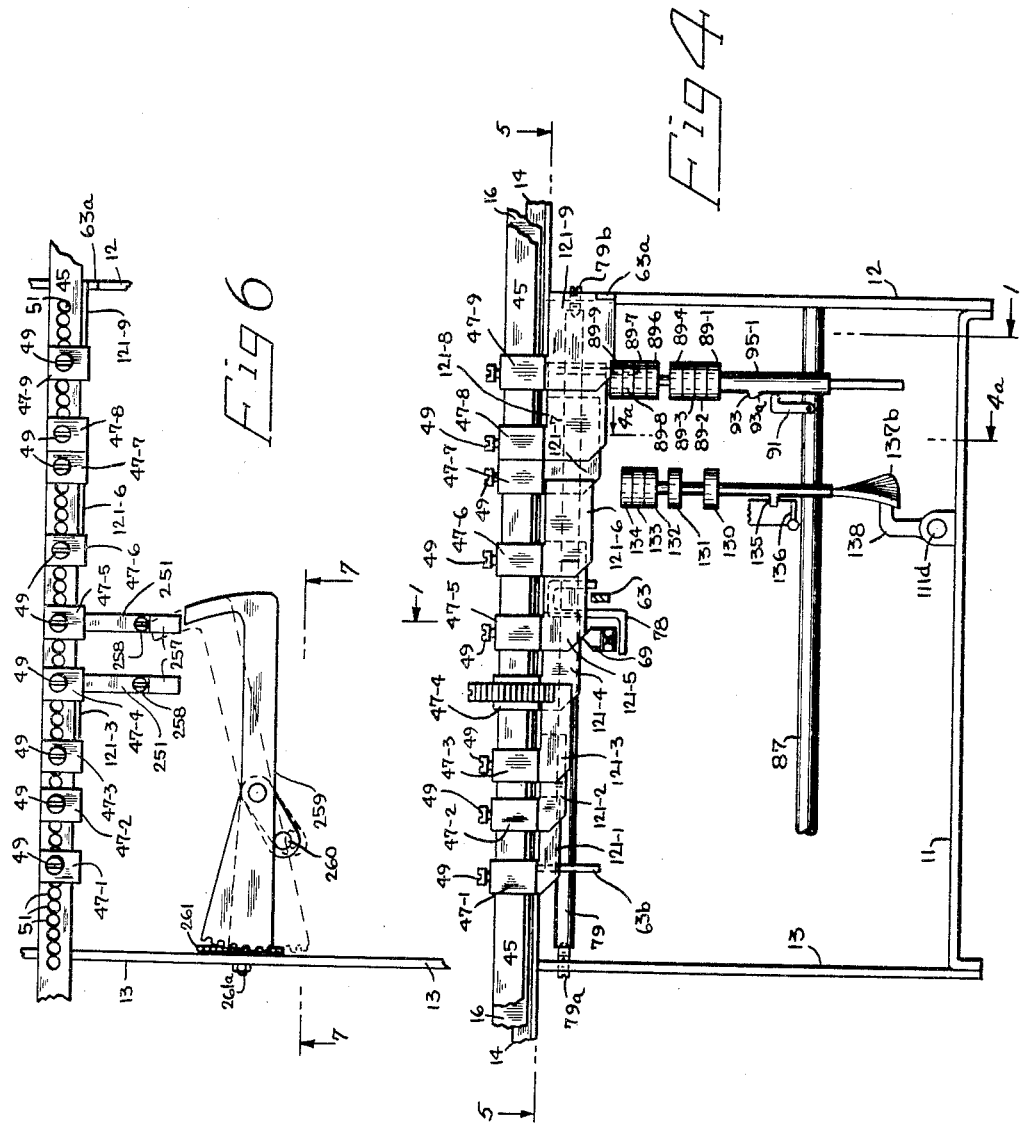

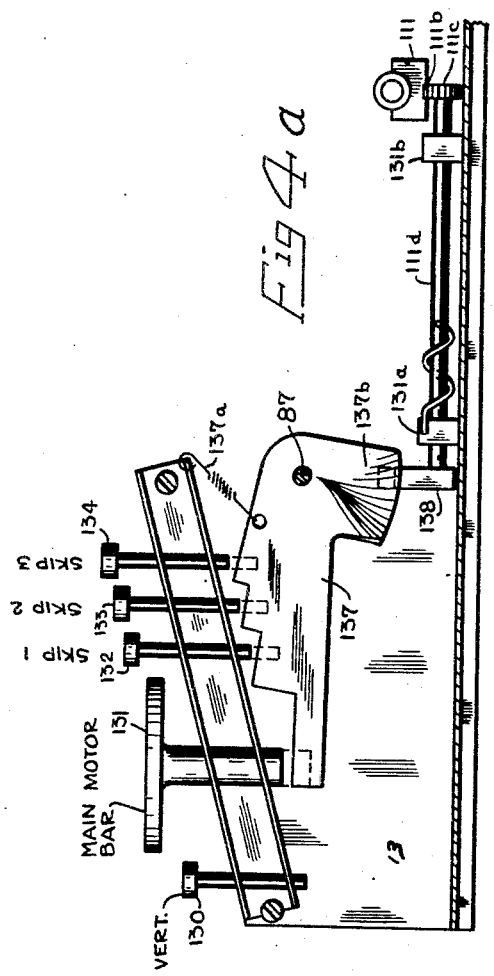

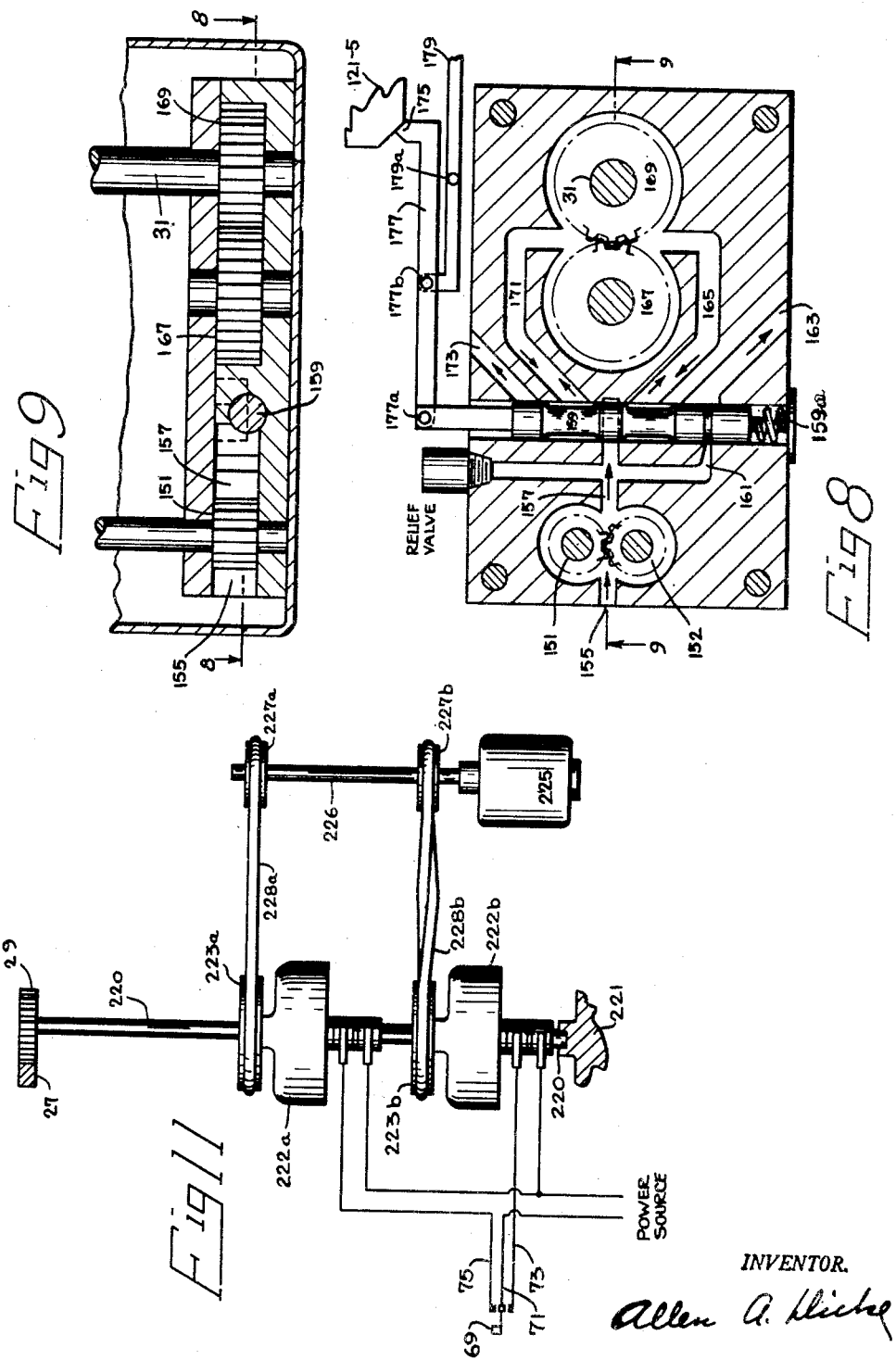

United States Patent Office 2,709,511
Patented May 31, 1955

2,709,511

CARRIAGE TRAVERSING MECHANISM FOR CALCULATING MACHINES

Allen A. Dicke, Montclair, N. J.

Application March 22, 1951, Serial No. 216,943

55 Claims. (Cl. 197—177)

This invention relates to carriage traversing mechanism for calculating machines and has for an object to provide a simple effective mechanism for power traversing the carriage of such machines in either direction to one of a plurality of predetermined positions.

The invention is applicable to printing carriages which carry a platen which is traversed relative to printing elements for column or letter spacing. However, the invention is applicable also to any type of calculating machine carriage such as the accumulator carriage in calculating machines of the Monroe, Marchant, Friden, and similar types. It may be also used to traverse carriage carrying totalizers of the interspersed type such as used in certain cash registers and accounting machines.

Another object is to provide a carriage traversing mechanism which may cause the carriage to move from any position to any other position, in either direction in response to the control of a column selecting key, or the like.

Another object is to provide such a device in which the carriage is provided with a controlling cam or template, made up of one or more parts together with a feeler mounted on an adjustable support and cooperating with said template, said feeler being adapted to control switch contacts or an equivalent valve to cause the carriage to be moved by power in the proper direction and to the proper extent to the position called for by the setting of the feeler.

Other objects relate to mechanism for setting the feeler support under the control of a lever, slide or keys and mechanism for advancing the setting of the feeler support one or more columnar positions as a result of the operation of the main operating mechanism of the calculating machine.

Another object is to provide such a device comprising an electrically reversible electric motor which is always geared directly to the carriage, so that any rotation of the motor will cause carriage movement, together with means controlled by said feeler to determine whether said motor shall stand still or rotate in either direction.

Another object is to provide a spring operated electrically released brake which is effective whenever there is no current applied to the motor.

Another object is to provide a spring operated aligning plunger which is electrically withdrawn whenever current is applied to the motor.

Another object is to provide a template formed by surfaces on cam plates carried by individual stop blocks adjustably supported on a replaceable stop bar mounted on the carriage, said plates lying in several different planes to permit telescoping relative to each other so that the stop blocks may be adjusted along the stop bar to a certain extent without disturbing the continuity of the template surface.

Another object is to provide such a device involving a continuously running driving motor together with a positive displacement reversible output member hydraulic transmission including a valve settable by a template controlled feeler which valve determines whether the output shaft rotates forwardly or reversely or is stationary.

Another object is to provide such a device having a constantly rotating electric motor together with a friction drive having a reversible output together with a template controlled feeler which determines whether the output element rotates forwardly, reversely, or stands still.

Other objects will become apparent from the following description taken in connection with the attached drawings showing several illustrative embodiments of the invention and wherein:

Fig. 1 is a vertical longitudinal cross-section, on the line 1—1 of Fig. 4, of a machine illustrating one form the invention may take, including a wiring diagram for controlling an electrically reversible series motor;

Fig. 1a is an enlarged detail view of a tappet for controlling machine functions;

Fig. 2 is an enlarged partial cross-section taken along the line 2—2 of Fig. 1;

Fig. 3 is a cross-section along the line 3—3 of Fig. 2;

Figs. 3-1, 3-2, 3-3, 3-4 and 3-5 are cross-sections along the similarly designated lines in Fig. 2;

Fig. 4 is a fragmentary front elevation of the machine of Fig. 1;

Fig. 4a is a partial section on the line 4a—4a of Fig. 4;

Fig. 5 is a cross-sectional view taken on the line 5—5 of Fig. 4;

Fig. 6 is a fragmentary plan view of a part of the machine shown in Figs. 1-4, also showing tappet controlled levers for controlling various machine functions;

Fig. 7 is a front elevation showing the template controlled function controlling levers as viewed from the line 7—7 of Fig. 6;

Fig. 8 is a horizontal cross-section of a modified construction employing an hydraulic transmission for traversing the carriage, taken on line 8—8 of Fig. 9;

Fig. 9 represents a cross-section taken on the line 9—9 of Fig. 8;

Fig. 10 is a cross-section of a modified form of construction employing a reversible clutch drive;

Fig. 11 is a cross-section of another modified form of reversible drive mechanism employing two magnetic clutches; and Fig. 12 is a time chart.

Referring to said drawings, and particularly Figs. 1 and 4 thereof, the numeral 11 designates a bottom plate, and 12 and 13 designate, respectively, the right and left side plates of a machine incorporating the invention in one form. Numerals 14 and 15 designate, respectively, the front and rear carriage supporting rails which are shown in the form of angle bars. 16 and 17 are, respectively, front and rear carriage frame members also formed of angle bars. 18 is a carriage cross member, one being provided at each end and upon which the platen 19 or other device is supported. 18a designates say, four rollers mounted on the carriage and running on the rails 14 and 15. 20 designates generally type carrier mechanism which may be caused to print upon the platen. Carried by the member 17 or formed integral therewith is an aligning bar 21 provided with a series of closely spaced conical recesses 22 adapted to receive an aligning plunger 23. This plunger is urged forward into effective position by means of a spring 24 and may be withdrawn at certain times by energizing the solenoid coil 25 to attract the armature 25a. Also carried by the rear carriage frame member 17 and possibly integrally therewith or with the bar 21, is a rack 27 with which constantly meshes gear 29 carried on shaft 31 which also carries worm wheel 33 driven by worm 35 on shaft 37 of electric motor 39. The upper end of shaft 31 is supported by a bracket 41 carried by the carriage supporting rail 15. Said bracket 41 preferably also supports the aligning plunger 23.

Detachably carried on the front carriage frame member 16, as by screws (not shown) is a stop bar 45 upon which are located a plurality of nine stop blocks 47–1 to 47–9, although any other number than nine may be employed. These stop blocks are of C-shape, as shown in Fig. 1, and are preferably held in position by set screws 49 each received in one of a series of conical recesses 51 in the top of the stop bar 45 (Fig. 6). These recesses are spaced exactly the same as recesses 22 which receive the aligning plunger 23.

Figs. 1, 2, 4, 5 and 6 show a preferred form of template for determining the positioning of the carriage. The several stop blocks 47 are provided with cam plates 121–1 to 121–9. Plates 121–1, 121–4 and 121–7 lie in the same plane. Plates 121–2, 121–5, and 121–8 lie in the same plane with each other but forwardly of 121–1, 121–4, and 121–7. Likewise, plates 121–3, 121–6, and 121–9 lie in the same plane with each other but forwardly of the plane of 121–2, 121–5, 121–8. Thus, the lower edges of the plates 121–1 to 121–9 provide a continuous surface for a feeler 69 (described later) and this is possible whether or not the stop blocks 47–1 to 47–9 are close together or spread a substantial distance apart in accordance with the column spacing requirements of the particular accounting operation. These cams are so formed that the neutral position of the feeler 69 is about half way between the lower surfaces of the successive plates. The leftward edges of the plates 121–1 to 121–9 are inclined at an angle of say, 45°, as shown. This provides a sensitive control of the feeler 69. This feeler is shown as carried on a spring contact finger 71 lying between the contact fingers 73 and 75. The contact fingers 71, 73, and 75 are carried on a bracket 77 mounted on a shaft 79. The shaft 79 is supported by the side plates 12 and 13, preferably on pivots 79a and 79b, as shown, and carries a control ratchet plate 83, the lower edge of which is formed with ratchet teeth 83a, and also carries a stud 83b which may cooperate with a surface 85b of a key lever 85 pivotally supported on shaft 87 extending between the side plates 12 and 13. The key lever 85 is of the general type shown in W. S. Gubelmann Patent 1,429,201, September 12, 1922. With that construction, the column selection keys 89–1 to 89–9 set the lever 85 in such a manner that the depression of key 89–2 will move the key lever 85 one step from its zero position and the successive keys will each cause one additional step of movement so that key 89–9 will cause eight steps of movement of key lever 85. In the position shown, key 89–5 is depressed and key lever 85 has been moved four steps causing ratchet plate 83 to be moved rearwardly four steps from its most forward position, viz., to the "column 5" position. The keys are latched down when depressed by any suitable means such as by the latch wing plate 91 (Fig. 4), engaging over the shoulder 93 on the stem 95 of the respective key. Projection 93a assures that when any key is depressed, any previously depressed key will be released. It will be noted that key 89–1 cannot engage key lever 85 and its only purpose is to release any previously depressed key, thus setting key lever 85 into the "Column 1" position where it is drawn by means of spring 85a. Unless prevented by other means to be presently described, ratchet plate 83 will then be able to assume its extreme forward position (Column 1 position) under the bias of spring 83c. It will also be seen that the depression of any of the keys 89–2 to 89–9 will cause the key lever 85, and therefore the ratchet plate 83, to be moved a corresponding distance.

Before describing a second means for controlling the position of plate 83, the function of the mechanism so far described will be explained.

It will be noted that contact finger 71 is connected through conductor 71a with the power source, the other side of which is connected to the energizing coils of the forward relay and reverse relay shown schematically in Fig. 1. The other side of the reverse relay is connected through conductor 73a with contact finger 73, and the other side of the forward relay is connected through conductor 75a with contact finger 75. Each of the relays is of the two pole, double throw type. The contacts thereof may be connected (as shown) to the armature A of a series motor and the field of said motor in the manner indicated. It will be noted that if contact finger 71 engages with the contact finger 73, the reverse relay will be energized and the motor 39 will be caused to run in such a direction as to move the carriage reversely (to the right) and that if the contact finger 71 engages contact finger 75, the reverse will take place causing forward carriage movement (to the left). Also, whenever the motor is energized, the coil 25 of the aligning plunger release solenoid will be energized. The same will apply to the coil 25a of a spring applied motor brake (if used) so that the brake will be released whenever the motor is energized. It will also be noted that if both the forward and the reverse relays should be accidentally energized at the same time, the circuit to the motor will not be completed.

In the position shown in Figs. 1 and 4, the carriage is in the No. 5 position. If, now, a higher value key is depressed, say 89–8, the key lever will be moved three steps counter-clockwise and the ratchet plate 83 will be moved three steps to the rear. Due to its bias the contact finger 71 now engages finger 75, which will cause the forward relay to be energized and the motor to drive the carriage forward (to the left, Fig. 4). This will continue until stop block 47–8 reaches the feeler 69, at which time the feeler is pushed down by template plate 121–8 just sufficiently far to break the contact between 71 and 75 causing the forward relay and consequently the motor 39 to be de-energized. At the same moment, aligning plunger 23 is released causing it to be driven by spring 24 into one of the recesses 22 to provide a correct alignment.

If, now, a lower value key is depressed, such as key 89–2, the key lever 85 will swing clockwise to the No. 2 position and ratchet plate 83 will, due to spring 83c, attempt to swing forward to the No. 2 position. This will cause contact finger 73 to engage finger 71. This energizes the reverse relay and causes the electric motor to run in such a direction as to return the carriage (to the right, Fig. 4). This continues until the No. 2 stop block reaches the feeler 69, at which time the circuit between 73 and 71 is broken as soon as feeler 69 rides down the inclined surface on plate 121–2. It will, therefore, be seen that upon the depression of any one of the keys 89–1 to 89–9 the carriage will be promptly moved to its corresponding columnar position whether this be to the right or to the left of the previous carriage position.

In calculating machines it is desirable to cause carriage tabulation forward one or more column spaces as an incident to the operation of the main operating mechanism of the machine. To accomplish this in the present machine, means are provided to ratchet the ratchet plate 83 rearwardly one or more steps upon each machine operation which requires carriage tabulation. To this end, operating pawl 101 (Fig. 1) is provided. It is pivoted at 101a to a lever 103 pivoted on pin 103a (Fig. 2) to the bottom of the machine and is biased counter-clockwise by spring 105. Pawl 101 is biased clockwise by spring 101b. 107 is the main operating shaft of the machine or any shaft which rotates in synchronism therewith in the direction shown. Feather keyed upon said shaft is a cam cluster 109 (see also Figs. 2, 3, 3–1, etc.) comprising five cam discs 110–1, 110–2, 110–3, 110–4 and 110–5 and a longer cam 116i. The cam cluster may be shifted on shaft 107 so as to bring into line with lever 103 the first, second, third or fourth cam discs 110–1, 110–2, 110–3 or 110–4 which are provided with one, two, three and four cam lobes, respectively, as shown in Figs. 3 to 3–5. Or, the cluster may be so shifted that none of said cam discs are lined up with lever 103 (as shown in Fig. 2). The fifth cam disc 110–5 is for the purpose of operating paper feed initiating mechanism when the cam cluster is so shifted as not to line up any of the first four cam discs with the lever 103. To this end there is provided the lever 104 (Fig. 2) which may be identical in form with lever 103 and mounted on the same pin 103a. Its upper end is connected to means, of known or suitable type, for turning the paper platen roll one or more steps. It will be noted that when the cam cluster 109 is shifted toward the left one, two, three or four steps, cam 110–5 is not able to operate line spacing lever 104. The cam cluster 109 may be shifted by any suitable means such as a claw 111 engaging in the annular groove 111a, said claw being carried by a rack 111b operable by pinion 111c fixed to shaft 111d. The means for causing shifting may be a group of keys which may be designated as "Main motor bar," "Skip 1," "Skip 2," "Skip 3," and "Vert." Such keys will usually serve also to release the machine for operation and will control the setting or directly set a differential slide or lever which is connected to the shaft 111d to move the cam cluster to the position corresponding to the key depressed.

One form which this mechanism may take is shown in Figs. 4 and 4a. A row of machine release keys is provided, the key 130 being designated the "Vert." key and serving to release the machine but not to shift the cam cluster 109, so that line spacing will take place. Key 131 is designated the "Main motor bar" and when depressed causes the cam cluster 109 to shift to the left one step (Fig. 2) and thereupon to release the machine for operation. "Skip 1" key 132, "Skip 2" key 133, and "Skip 3" key 134 serve to move the cam cluster 109 to the left two, three or four steps, respectively, and then release the machine for operation.

Each of the keys 130–134 is shown formed with an extension or shoulder 135 (Fig. 4) which strikes a bail 136 just before the key depressed reaches the end of its stroke. The bail 136 operates machine releasing means (not shown) which may be of any known or suitable construction.

Underlying said keys 131–134 is a key lever 137 pivoted on cross shaft 87. Its upper edge is so formed that depression of key 131 gives the lever one step of movement against the pull of spring 137a, and depression of keys 132, 133, and 134 gives the lever two, three and four steps of movement respectively.

The lever 137 is shown as formed with a lower extension 137b which is bent into helical form (Fig. 4). Bearing against said helical extension is the end of a lever 138 carried by shaft 111d (Figs. 2, 4 and 4a) supported in bearings 139a and 139b. A spring such as 140 is provided to urge the shaft 111d and connected parts clockwise as viewed in Figs. 2 and 4, so that the cam cluster 109 is held in the position shown in Fig. 2 unless one of the keys 131, 132, 133, or 134 is depressed, or the cam cluster is moved by other means such as by the main operating mechanism in response to the control of a tappet on the carriage as will be described later.

It will be seen therefore that the depression of any one of the keys 130–134 will cause the adding and listing machine to operate and that if key 130 is the one depressed, line spacing will occur so that a vertical column of figures is printed, and that if one of the keys 131–134 is depressed, the carriage will, after printing has occurred, be tabulated forward one, two, three or four column spaces, respectively, and that line spacing will not take place.

Means are provided to prevent the shifting of the cam cluster 109 during a machine operation. In the form shown, this comprises a pin 113 carried by some fixed part of the machine such as the bracket 113a which pin reaches into a slot 113b in the cam cluster. The projection is so located that it lies between adjacent cams or just outside of cam 110–1 when the cam cluster is in one of its operating positions. Therefore, the cam cluster will be locked in the axial position to which it has been set as soon as the shaft 107 starts its rotation. In the position shown in Fig. 2, the pin 113 is located just outside of cam 110–1 so that the cam cluster cannot move to the left after it has rotated from its home position. Movement further to the right is always prevented by the engagement of cam 110–5 with a suitable stop surface.

In the form shown, the ratchet member 83 is advanced one, two, three or four steps by providing cams having one, two, three or four lobes each of which causes the member 83 to be advanced one tooth. It is to be understood, of course, that the same result can be obtained by having each of the cams 110–1, 110–2, 110–3 and 110–4 formed with one lobe but of progressively greater radial extent so as to give progressively larger movements to the lever 103 and the pawl 101 so that the pawl will advance the ratchet member 83 one, two, three or four teeth at one machine operation.

When the machine is operated with any column in the printing position, the shaft 107 makes approximately ½ revolution before printing occurs (see Fig. 12, line 5), after which the lobe of the first cam (assuming that the cam 110–1 is lined up with lever 103) cams lever 103 rearwardly camming the pawl 101 to ratchet the ratchet plate 83 rearwardly one step (assuming that pawl 101 is in its upper effective position). After this rearward stroke of pawl 101, it again moves forward but the plate 83 is held in its next position by holding dog 115 pivoted at 115a to the frame of the machine and biased upwardly by spring 115b. Pawl 101 has a rearward extension 101c and holding dog 115 has a rearward extension 115c. These extensions cooperate with pins 116a and 116b, respectively, mounted on a lever 116 pivoted at 116c to the frame of the machine. This lever has a springy extension 116d and a further extension 116e which carries a stud 116f which cooperates with the surfaces 85c and 85d on the key lever 85. The parts are so proportioned that when the key lever 85 is in its extreme clockwise position, stud 116f lies against surface 85d whereupon the lever 116 is moved clockwise by spring 116g, lowering pins 116a and 116b and thereby allowing pawl 101 and holding dog 115 to rock clockwise to effective position. Therefore, said pawl and dog are always in effective position when the key lever 85 is in its extreme clockwise position so that the ratchet plate 83 will be ratcheted rearward at each machine operation one, two, three or four steps (except when the cam cluster 109 is in line spacing position).

The lever 116 also has a downward extension 116h which cooperates with cam 116i (Figs. 2 and 3) on the revolution shaft 107. This cam is preferably part of the cam cluster 109 and is of such axial length that it will cooperate with extension 116h on any tabulating operation. A cam may also be provided on the revolution shaft which operates means to rock the latch plate 91 immediately after cam 116i rocks lever 116 in any tabulating operation to cause the release of any of the keys 89–1 to 89–9 which may have been depressed. (See Fig. 12, line 13.) Cam 116i may be used for this purpose to operate a lever (not shown) in the same transverse plane as extension 116h but about 10° later in the operation. Or a linkage may be provided which is operated to release the keys 89 when the lever 116 is rocked clockwise about its pivot 116c by the action of cam 116i.

Assuming that, with the parts in the position shown in Fig. 1, a machine operation involving tabulating occurs, the following will happen:

From about 30° to about 150° rotation of revolution shaft 107, the differential mechanism (which may be of any known or suitable type) is set in accordance with the values of any depressed amount keys and the printing type carriers 20 are set accordingly, whereupon printing occurs. Shortly thereafter (at about 200°) the projection 116h is cammed forwardly rocking lever 116 clockwise and permitting the pawl 101 and dog 105 to rise. Shortly thereafter, the depressed key 89–5 is released so that the lever 85 swings to the right. Ratchet disc 83 is, however, held by dog 115. Immediately thereafter, the first tabulating cam pushes lever 103 rearwardly causing the pawl 101 to cam the plate 83 rearwardly one step (or two or three or four steps depending upon which of the cam discs 110–1, 110–2, 110–3 or 110–4 is lined up with lever 103). When plate 83 is given one or more steps of movement, feeler 69 is withdrawn from plate 121–5, a circuit is made between 71 and 75 causing the forward relay to be energized and causing the motor to run forwardly moving the carriage to the left. This will continue until the No. 6 stop block is in line with feeler 69 assuming that plate 83 was ratcheted forward one step. When this occurs, the plate 121–6 pushes feeler 69 down causing the circuit between 71 and 75 to be broken. The forward relay rises, the motor is de-energized, the motor brake applied and the aligning plunger 23 allowed to enter one of the holes 22. It will be noted that lever 116 is rocked clockwise even if pin 116f engages the higher surface 85c. This is permitted by the springy section 116d.

If, as a result of a tabulating operation when the carriage stands in the No. 9 position, the carriage moves still further to the left, the forward extension 63a of stop plate 121–9 will engage with carriage return trip 63 (shown in Fig. 4) which through suitable connections (not shown) serve to move down member 63c (Figs. 1 and 2) which is provided with pins 64 and 65 which serve to move the pawl 101 and dog 115 downwardly thus releasing the ratchet plate 83 which swings to the left under the action of spring 83c. This will cause contact finger 73 to engage finger 71, energizing the reverse relay and causing the motor to rotate in reverse, returning the carriage to the No. 1 position. During this return movement feeler 69, shaft 79 and ratchet plate 83 move gradually clockwise (Fig. 1). To prevent re-engagement of pawl 101 and dog 115 before plate 83 has returned to the No. 1 position, the connections between 63 and 63c are subjected to friction to hold them in place. This may take the form of spring pressed plunger 63d (Fig. 2). After the plate 83 has reached the No. 1 position, finger 63b (Fig. 4) strikes 63 and restores it to normal position.

Figs. 8 and 9 show a modification in which a positive displacement hydraulic transmission is used for moving the carriage. The electric motor constantly drives the pump which may consist of pump gears 151 and 152 which receive fluid (oil) through intake 155 and discharge it through delivery passage 157. The flow is controlled by a typical spool valve 159, biased downwardly as by spring 159a. In the position shown, the oil is discharged through passages 161 and 163. If, however, the spool 159 is lifted, this discharge passage is closed and a passage is opened to the conduit 165 allowing oil to be applied to the motor gears 167, 169 causing them to rotate. The oil is discharged from the motor gears through passages 171 and 173. If the spool valve 159 is moved downwardly, the discharge passage from 161 to 163 is closed and oil is admitted from passage 157 to passage 171, passes through the motor gears and through passage 165 and out through passage 163 causing the hydraulic motor to run in the reverse direction. Whenever the valve is in the center position, the motor gears are locked against rotation by hydraulic locking.

The position of valve 159 is controlled by a feeler 175 operating on the surface on plates 121–1 to 121–9. The feeler is carried by a lever 177 pivoted to the valve at 177a and to a fulcrum 177b carried on a lever 179 pivoted at 179a. The right hand end of lever 179 would be adjustable as by means such as the ratchet plate 83 (Fig. 1) and the means for setting the position of said plate 83.

It will be understood that the motor gear 169 drives the shaft 31 and pinion 29 (Fig. 1) for translating the carriage. The pump, motor, and control valve mechanism are all enclosed in a sump which contains the operating oil, so that any leakage oil from the pump, motor, or valve means, remains in the sump.

Another form the invention may take is shown in Fig. 10. In this form an electric motor or the like is employed to drive constantly the shaft 180 in the same direction. This drive may be by means of a belt 182 operating pulley 184 on shaft 180. The belt is operated by a similar pulley on the motor shaft. It will be noted that this form of drive permits a limited axial movement of shaft 180 for a purpose to be described presently. Any other drive may be employed which permits axial movement of the shaft such as a spur pinion on the motor shaft driving a spur gear on shaft 180. The shaft is supported in bearings 186 which may be formed on the gear housing 188 which also has a bearing 190 for shaft 200. Mounted on shaft 180 for free rotation are bevel gears 181a and 181b meshing with bevel gear 200a on shaft 200. Shaft 200 is arranged vertically and carries a pinion such as the pinion 29 (Fig. 1) meshing with the rack 27 on the carriage. Mounted for rotation with shaft 180 is a bushing 180a provided with at least one axial projection 180a′ extending toward gear 181a and at least one projection 180b′ extending toward gear 181b. Gear 181a has at least one axial projection 181a′ and gear 181b has at least one axial projection 181b′. The shaft 180 and parts carried thereby have a limited axial freedom of movement and it will be seen that such movement to the left will cause gear 181a to rotate with shaft 180 causing shaft 200 to be rotated in one direction and that such axial movement of shaft 180 to the right will cause gear 181b to rotate with shaft 180, causing shaft 200 to be rotated in the other direction.

A suitable means for controlling the axial position of shaft 180 may comprise the armature 180b fixed on shaft 180 made of soft iron or electric steel. Spring 202 located between the bearing 186 and armature 180b and spring 203 located between armature 180b and a suitable bracket 204 serve to normally hold the shaft 180 in the central position shown so that no driving connection is made to shaft 200. 205a and 205b are magnetic windings. If winding 205a is energized, armature 180b is drawn to the left causing projection 180a′ to engage projection 181a′ causing the shaft 200 to be rotated in one direction, and if winding 205b is energized the opposite action will be secured. The windings may be connected, as shown, to the switch blades 71, 73 and 75 of Fig. 1 whereby carriage movement is controlled by the coaction of feeler 69 with one of the plates 121–1 to 121–9.

In order to energize the actuating coil 25 for retracting the plunger 23 (Fig. 1) and also, if desired, to energize the motor only when needed, relays 206 and 207 are energized alternately by the engagement of blade 75 or 73 with the blade 71 as is clear from the wiring diagram. Each relay is of the two-pole normally open type. One contact of relay 206 closes a circuit through winding 205b and the other contact of relay 206 closes a circuit through the electric motor and the winding 25. One contact of relay 207 closes a circuit through winding 205a and the other contact of relay 207 closes a circuit through the electric motor and the winding 25.

It may be desirable to use as relays 206 and 207 relays of the "delayed attract" type providing a delay in the closing of the contacts of a small fraction of a second. This gives time for the aligning plunger 23 to seat and in this way "hunting" is reduced to a minimum. Relays of the "delayed attract" type are preferably also used in the form shown in Fig. 1.

It will be readily understood that this form of relay circuit may also be used with the form of construction shown in Fig. 11 to be presently described.

In the form of the invention shown in Fig. 11, the rack 27 is driven by pinion 29 (Fig. 1), the pinion being mounted on the upper end of the vertical shaft 220 the lower end of which is journaled in the step bearing 221. Mounted on shaft 220 are two magnetic clutch units 222a and 222b which may be of standard construction. Said units are provided with pulleys 223a and 223b which normally rotate freely with respect to the shaft 220. The constantly running electric motor 225 has a shaft 226 carrying two belt pulleys 227a and 227b. Pulley 227a is shown connected to pulley 223a by open belt 228a whereas pulley 227b is connected to pulley 223b by crossed belt 228b. Therefore, pulleys 223a and 223b will always rotate in opposite directions. It will be obvious that when clutch 222b is effective, shaft 220 will rotate in one direction to move the carriage, say forwardly, and when clutch 222a is energized, shaft 220 will rotate in the other direction to return the carriage (to the right, Fig. 4). Relays similar to the relays 206 and 207 of Fig. 10 are preferably employed to control the energization of aligning plunger retracting coil 25.

It will be noted that the several modified forms of means for translating the carriage shown and described operate on the same priniciple, viz., a source of mechanical power (an electric or an hydraulic motor) is provided and connected or connectible to the carriage for translating the carriage in one or the other direction, together with means for controlling the application of the carriage translating force in either direction (such as a double-throw switch or an hydraulic valve) which controlling means is biased to normally effect carriage movement in one direction, but may be moved to cause carriage movement in the other direction, together with columnar controlling cams carried by the carriage and translated therewith which serve to set said controlling means against its normal bias to a neutral position (or movement in the other direction) together with means for variably setting the controlling means to determine which of said columnar controlling cams shall set said controlling means to neutral.

Referring to Figs. 1, 4 and 6, each of the stop blocks 47–1 to 47–9 preferably also carries suitable tappets for controlling various functions of the machine in accordance with the columnar position of the carriage. In the form shown, this comprises a U-shaped tappet support bracket 251. Mounted between the horizontal arms of said bracket are a plurality of tappets 257 (twelve being shown) preferably formed as shown enlarged in Fig. 1a. Each tappet is formed with three holes 257–1, 257–2 and 257–3, one of which receives the clamping bolt 258. Since either end of the tappets may point forwardly each tappet may be in one of six effective positions. Each tappet serves to control the position of the respective one of the twelve tappet levers 259. Normally all the tappet levers will be moved to withdrawn position shown in full lines in Fig. 6 by the universal restoring bar 260, operated by the main operating mechanism. This occurs at about 210° of movement of shaft 107 (Fig. 12, line 12). However, the bar 260 will be moved to the dotted line position of Fig. 6 at the beginning of each machine operation permitting the tappet levers 259 to move rearwardly to "feel" the tappets, and take a position determined by the location of its related tappet. Each tappet lever 259 is intergeared, as shown, at its left end with the upper end of an associated vertical lever 261 (Fig. 7) pivoted on the pin 261a carried by a fixed part of the machine such as the left side frame 13. Its upper end is formed as a gear sector meshing with the gear sector on the left end of its associated lever 259.

The vertical levers 261 serve to set suitable function controlling members. These members may conveniently be control slides such as the horizontal control slides shown in Figs. 10, 11, 12, 29 and 88 of William S. Gubelmann U. S. Patent 2,226,919. By forming such slides, say twelve in number in the present machine, with suitable notches any desired function control can be secured by using, for example, mechanism such as disclosed in said patent.

It is contemplated that the following functions may be controlled by the tappets on the carriage and the mechanism controlled thereby:

Add Counter 1
Subtract Counter 1
Sub Total Counter 1
Total Counter 1
Add Counter 2
Subtract Counter 2
Sub Total Counter 2
Total Counter 2, etc., for any number of totalizers
Return carriage to No. 1 position
Move carriage to No. 2 or any other position
Split printing at preset position
Cause Non printing
Non print Cents
Non Print Amount
Non Print All
Print Keyboard Date
Print Day Only
Print Month and Day
Print Month, Day and Year
Disable Automatic Tabulation
Tabulate One Column
Tabulate Skip One Column
Tabulate Skip Two Columns
Tabulate Skip Three Columns
Open Carriage Throat
Feed Paper
Feed Paper and Open Throat
Automatic Cycling and such other functions as may be required.

It will be noted that the constructions shown and described will serve admirably to accomplish the objects stated above. It is to be understood, however, that the constructions disclosed above are intended merely as illustrative of the invention and not as limiting as various other modifications therein may be made without departing from the invention as defined by a proper interpretation of the claims which follow.

I claim:

1. In a calculating machine of the type having a frame member and a carriage translatable relative to said frame member, the combination of a power source and driving means intermediate said power source and said carriage constructed and arranged to move said carriage relative to said frame member, together with means for controlling the supply of power from said power source to said carriage to drive said carriage in one direction when said power supply controlling means is in a certain position, and for controlling the supply of power from said power source to said carriage to drive said carriage in the other direction when said power supply controlling means is in another position, and for supplying no power to move said carriage when said power supply controlling means is in a neutral position, and cam-responsive means for controlling said power supply controlling means, and cam means on said carriage and movable therewith serving to position said power supply controlling means to neutral so that no power is applied for moving the carriage, said cam means having effective surface areas in progressively different positions each defining a carriage position, said cam-responsive means for controlling said power supply controlling means being adjustable to progressively different positions each corresponding to one of said cam surface areas, whereby when the cam-responsive means is positioned in a certain position the carriage will be caused to move to the position corresponding to the position of said cam-responsive means at which position the corresponding cam surface will cam said cam-responsive means to neutral to cause the power supply controlling means to be moved to neutral position.

2. The combination according to claim 1 in which the power source is a reversible electric motor.

3. The combination according to claim 1 in which the power source is a reversible electric motor and the power supply controlling means are two relays having contacts to control the operation of said electric motor in either direction.

4. The combination according to claim 1 in which the power source is a reversible electric motor and the power supply controlling means are two relays, one of which when energized causes the motor to operate in one direction and the other of which when energized causes the motor to operate in the other direction.

5. The combination according to claim 1 in which the power source is a reversible electric motor and the power supply controlling means are two relays, one of which when energized causes the motor to operate in one direction and the other of which when energized causes the motor to operate in the other direction and the cam-responsive means comprise a double-throw switch connected to for controlling said relays alternatively.

6. The combination according to claim 1 in which the power source is a reversible electric motor and the cam-responsive means comprise a double-throw switch connected to for controlling said electric motor for operation in one direction or another.

7. The combination according to claim 1 in which the power source is a unidirectional electric motor and the driving means comprises a power transmission driven by said electric motor and having a power output member operable in either of two directions to drive the carriage in either direction.

8. The combination according to claim 1 in which the power source is a unidirectional electric motor and the driving means comprises a power transmission driven by said electric motor and having a power output member operable in either of two directions to drive the carriage in either direction, and the power supply controlling means comprise two electro-magnetic devices, one of which, when energized, causes said output member and carriage to move in one direction and the other of which, when energized, causes the output member and carriage to move in the other direction.

9. The combination according to claim 1 in which the power source is a unidirectional electric motor and the driving means comprises a power transmission driven by said electric motor and having a power output member operable in either of two directions to drive the carriage in either direction, and the power supply controlling means comprise two electro-magnetic devices, one of which, when energized, causes said output member and carriage to move in one direction and the other of which, when energized, causes the output member and carriage to move in the other direction and said cam-responsive means comprise a double-throw switch connected to for energizing said electro-magnetic devices alternately.

10. The combination according to claim 1 in which the cam-responsive means comprises a member which is biased in one direction so that, when not restrained by a cam it will be positioned to so control the power supply controlling means as to cause the carriage to move in one direction.

11. The combination according to claim 1 in which the power source is a reversible electric motor and the power supply controlling means are two relays of the delayed attract type having contacts to control the operation of said electric motor in either direction.

12. The combination according to claim 1 in which the power source is a reversible electric motor and the power supply controlling means are two relays of the delayed attract type, one of which when energized causes the motor to operate in one direction and the other of which when energized causes the motor to operate in the other direction.

13. The combination according to claim 1 together with manipulative means for positioning said cam-responsive means to one of a plurality of positions of adjustment.

14. The combination according to claim 1 together with manipulative means for positioning said cam-responsive means to one of a plurality of positions of adjustment, said manipulative means comprising a plurality of keys operable to set a differential member to set said cam-responsive means differentially.

15. The combination according to claim 1 together with manipulative means for positioning said cam-responsive means to one of a plurality of positions of adjustment, and a second means for positioning said cam-responsive means.

16. The combination according to claim 1 together with manipulative means for positioning said cam-responsive means to one of a plurality of positions of adjustment, and a second means for positioning said cam-responsive means by advancing the position of said cam-responsive means one or more steps at will.

17. The combination according to claim 1 together with manipulative means for positioning said cam-responsive means to one of a plurality of positions of adjustment, and a second means for positioning said cam-responsive means by advancing the position of said cam-responsive means one or more steps at will, said last mentioned means comprising a ratchet and pawl mechanism.

18. The combination according to claim 1 together with means for advancing said cam-responsive means one or more steps at will.

19. The combination according to claim 1 together with means for advancing said cam-responsive means one or more steps at will, said last mentioned means comprising a ratchet and pawl mechanism.

20. The combination according to claim 1 in which the cam-responsive means is mounted on a shaft mounted for oscillation in the frame of the machine.

21. The combination according to claim 1 in which the cam-responsive means is mounted on a shaft mounted for oscillation in the frame of the machine together with manipulative means for positioning said shaft to one of a plurality of positions.

22. The combination according to claim 1 in which the cam-responsive means is mounted on a shaft mounted for oscillation in the frame of the machine together with manipulative means for positioning said shaft to one of a plurality of positions, said manipulative means comprising a plurality of keys operable to set a differential member to set said shaft.

23. The combination according to claim 1 in which the cam-responsive means is mounted on a shaft mounted for oscillation in the frame of the machine together with manipulative means for positioning said shaft to one of a plurality of positions, said manipulative means comprising a plurality of keys operable to set a differential member to set said shaft, and a second means for positioning said shaft.

24. The combination according to claim 1 in which the cam-responsive means is mounted on a shaft mounted for oscillation in the frame of the machine together with manipulative means for positioning said shaft to one of a plurality of positions, said manipulative means comprising a plurality of keys operable to set a differential member to set said shaft, and a second means for positioning said shaft by advancing the position of said cam-responsive means one or more steps at will.

25. The combination according to claim 1 in which the cam-responsive means is mounted on a shaft mounted for oscillation in the frame of the machine together with manipulative means for positioning said shaft to one of a plurality of positions, said manipulative means comprising a plurality of keys operable to set a differential member to set said shaft, and a second means for positioning said shaft by advancing the position of said cam-responsive means one or more steps at will, said last mentioned means comprising a ratchet and pawl mechanism.

26. In a calculating machine of the type having a frame member, a carriage translatable relative to said frame member, a platen on said carriage, printing mechanism for printing on paper on said platen and a general operating mechanism serving to operate said printing mechanism, the combination of a power source and driving means intermediate said power source and said carriage constructed and arranged to move said carriage relative to said frame member, together with means for controlling the supply of power from said power source to said carriage to drive said carriage in one direction when said power supply controlling means is in a certain position, and for controlling the supply of power from said power source to said carriage to drive said carriage in the other direction when said power supply controlling means is in another position, and for supplying no power to move said carriage when said power supply controlling means is in a neutral position, and cam-responsive means adjustable to a plurality of positions transverse to the direction of carriage movement for controlling said power supply controlling means, and cam means on said carriage and movable therewith mounted at different positions longitudinally of the carriage and arranged at progressively different positions transversely to the direction of movement of the carriage and serving to position said power supply controlling means to neutral so that no power is applied for moving the carriage together with means operated by said general operating mechanism for advancing said cam-responsive means one or more steps at each operation of the general operating mechanism.

27. The combination according to claim 26 in which the last mentioned means comprises a ratchet and pawl mechanism.

28. The combination according to claim 26 in which the last mentioned means comprises a ratchet and pawl mechanism, said pawl being operated one or more times by cam means operated by the general operating mechanism.

29. The combination according to claim 26 in which the last mentioned means comprises a ratchet and pawl mechanism, said pawl being operated one or more times by cam means operated by the general operating mechanism, said ratchet and pawl mechanism comprising a ratchet member connected to for positioning said cam-responsive member, a spring for urging said ratchet in one direction, a pawl for actuating said ratchet member against the bias of said spring and a holding dog to hold said ratchet member against the bias of said spring.

30. The combination according to claim 26 in which the last mentioned means comprises a ratchet and pawl mechanism, said pawl being operated one or more times by cam means operated by the general operating mechanism, said ratchet and pawl mechanism comprising a ratchet member connected to for positioning said cam-responsive member, a spring for urging said ratchet in one direction, a pawl for actuating said ratchet member against the bias of said spring and a holding dog to hold said ratchet member against the bias of said spring and key actuated means for disengaging said pawl and dog from the ratchet member.

31. The combination according to claim 26 in which the last mentioned means comprises a ratchet and pawl mechanism, said pawl being operated one or more times by cam means operated by the general operating mechanism, said ratchet and pawl mechanism comprising a ratchet member connected to for positioning said cam-responsive member, a spring for urging said ratchet in one direction, a pawl for actuating said ratchet member against the bias of said spring and a holding dog to hold said ratchet member against the bias of said spring, and means operated by said carriage for disengaging said pawl and dog from the ratchet member.

32. The combination according to claim 26 in which the last mentioned means comprises a ratchet and pawl mechanism, said pawl being operated one or more times by cam means operated by the general operating mechanism, said ratchet and pawl mechanism comprising a ratchet member connected to for positioning said cam-responsive member, a spring for urging said ratchet in one direction, a pawl for actuating said ratchet member against the bias of said spring and a holding dog to hold said ratchet member against the bias of said spring together with key actuated means for also disengaging said pawl and dog from the ratchet member.

33. The combination according to claim 26 in which the last mentioned means comprises a ratchet and pawl mechanism including a cam cluster feather-keyed on a shaft rotated by the general operating mechanism, which cam cluster comprises a plurality of axially spaced cams having a different number of cam lobes, and a cam operated member which may be operated by that one of said cams which is brought into line with said member by axial shifting of said cam cluster, whereby said cam operated member may be operated a different number of times during each shaft revolution.

34. The combination according to claim 26 in which the last mentioned means comprises a ratchet and pawl mechanism including a cam cluster feather-keyed on a shaft rotated by the general operating mechanism, which cam cluster comprises a plurality of axially spaced cams of different conformation, and a cam operated member which may be operated by that one of said cams which is brought into line with said member by axial shifting of said cam cluster, whereby said cam operated member may be operated in a different manner in a shaft revolution depending upon which cam is in line therewith.

35. In a calculating machine of the type having a frame member, a carriage translatable relative to said frame member, a rotatable cylindrical platen on said carriage, printing mechanism for printing on paper on said platen, means for rotating said platen step by step for line spacing said paper, and a general operating mechanism serving to operate said printing mechanism, the combination of a power source and driving means intermediate said power source and said carriage constructed and arranged to move said carriage relative to said frame member, together with means for controlling the supply of power from said power source to said carriage to drive said carriage in one direction when said power supply controlling means is in a certain position, and for controlling the supply of power from said power source to said carriage to drive said carriage in the other direction when said power supply controlling means is in another position, and for supplying no power to move said carriage when said power supply controlling means is in a neutral position, and cam-responsive means for controlling said power supply controlling means, and cam means on said carriage and movable therewith serving to position said power supply controlling means to neutral so that no power is applied for moving the carriage, said cam means having effective surface areas in progressively different positions each defining a carriage position, together with means operated by said general operating mechanism for advancing said cam-responsive means at least one step at each operation of the general operating mechanism or for line spacing said platen.

36. The combination according to claim 35 in which the last mentioned means comprises a plurality of cams one of which may be made effective to advance said cam-responsive means or the other of which cams may be made effective to effect line spacing.

37. The combination according to claim 35 in which the last mentioned means comprises a plurality of cams one of which may be made effective to advance said cam-responsive means or the other of which cams may be made effective to effect line spacing, said cams forming a cam cluster feather-keyed on a shaft rotated by the general operating mechanism.

38. The combination according to claim 35 in which the last mentioned means comprises a plurality of cams one of which may be made effective to advance said cam-responsive means or the other of which cams may be made effective to effect line spacing, said cams forming a cam cluster feather-keyed on a shaft rotated by the general operating mechanism together with two cam operated members one adapted to advance said cam-responsive means and the other adapted to cause line spacing, said two cam operated means being so positioned that when the cam cluster is in one axial position one of said cams operates the cam-operated member to advance said cam-responsive means and when said cam cluster is in another position the other of said cams operates the cam operated member which causes line spacing.

39. The combination according to claim 35 in which the last mentioned means comprises unitary cam means which may be made effective at will to advance said cam-responsive means or to effect line spacing.

40. The combination according to claim 35 in which the last mentioned means comprises unitary cam means which may be made effective at will to advance said cam-responsive means or to effect line spacing, said cam means forming a cam-cluster feather-keyed on a shaft rotated by the general operating mechanism.

41. The combination according to claim 35 in which the last mentioned means comprises unitary cam means which may be made effective at will to advance said cam-responsive means or to effect line spacing, said cam means forming a cam-cluster feather-keyed on a shaft rotated by the general operating mechanism together with two cam operated members one adapted to advance said cam-responsive means and the other adapted to cause line spacing, said two cam operated means being so positioned that when the cam cluster is in one axial position one member of said cam means operates the cam operated member to advance said cam-responsive means and when said cam cluster is in another position another member of said cam means operates the cam operated member which causes line spacing.

42. The combination according to claim 26 in which the last mentioned means comprises a ratchet and pawl mechanism, said pawl being operated one or more times by cam means operated by the general operating mechanism, said ratchet and pawl mechanism comprising a ratchet member connected to for positioning said cam-responsive member, a spring for urging said ratchet in one direction, a pawl for actuating said ratchet member against the bias of said spring and a holding dog to hold said ratchet member against the bias of said spring and key actuated means for disengaging said pawl and dog from the ratchet member together with means operated by the general operating mechanism for at times overcoming said action of said key actuated means to permit said pawl and dog to engage the ratchet member irrespective of the position and action of said key actuated means.

43. The combination according to claim 26 in which the last mentioned means comprises a ratchet and pawl mechanism, said pawl being operated one or more times by cam means operated by the general operating mechanism, said ratchet and pawl mechanism comprising a ratchet member connected to for positioning said cam-responsive member, a spring for urging said ratchet in one direction, a pawl for actuating said ratchet member against the bias of said spring and a holding dog to hold said ratchet member against the bias of said spring and key actuated means for disengaging said pawl and dog from the ratchet member together with means operated by the general operating mechanism for at times overcoming said action of said key actuated means to permit said pawl and dog to engage the ratchet member irrespective of the position and action of said key actuated means, said overcoming means comprising a cam operated by the general operating mechanism and a cam follower operated thereby.

44. The combination according to claim 26 in which the last mentioned means comprises a ratchet and pawl mechanism, said pawl being operated one or more times by cam means operated by the general operating mechanism, said ratchet and pawl mechanism comprising a ratchet member connected to for positioning said cam-responsive member, a spring for urging said ratchet in one direction, a pawl for actuating said ratchet member against the bias of said spring and a holding dog to hold said ratchet member against the bias of said spring and key actuated means for disengaging said pawl and dog from the ratchet member together with means operated by the general operating mechanism for at times overcoming said action of said key actuated means to permit said pawl and dog to engage the ratchet member irrespective of the position and action of said key actuated means, said overcoming means comprising a cam operated by the general operating mechanism and a cam follower operated thereby, said cam being feather-keyed to a shaft for axial movement thereon into and out of line with said cam follower.

45. The combination according to claim 26 in which the last mentioned means comprises a ratchet and pawl mechanism including a cam cluster feather-keyed on a shaft rotated by the general operating mechanism, which cam cluster comprises a plurality of axially spaced cams of different conformation, and a cam operated member which may be operated by that one of said cams which is brought into line with said member by axial shifting of said cam cluster, whereby said cam operated member may be operated in a different manner in a shaft revolution depending upon which cam is in line therewith, together with a plurality of manipulative control members the operation of any of which will axially shift said cam cluster.

46. The combination according to claim 26 in which the last mentioned means comprises a ratchet and pawl mechanism including a cam cluster feather-keyed on a shaft rotated by the general operating mechanism, which cam cluster comprises a plurality of axially spaced cams of different conformation, and a cam operated member which may be operated by that one of said cams which is brought into line with said member by axial shifting of said cam cluster, whereby said cam operated member may be operated in a different manner in a shaft revolution depending upon which cam is in line therewith, together with a plurality of manipulative control members the operation of any of which will axially shift said cam cluster and will cause the general operating mechanism to be operated.

47. The combination according to claim 26 in which the last mentioned means comprises a ratchet and pawl mechanism including a cam cluster feather-keyed on a shaft rotated by the general operating mechanism, which cam cluster comprises a plurality of axially spaced cams of different conformation, and a cam operated member which may be operated by that one of said cams which is brought into line with said member by axial shifting of said cam cluster, whereby said cam operated member may be operated in a different manner in a shaft revolution depending upon which cam is in line therewith, together with a plurality of control keys the operation of which will cause said cam cluster to be differentially shifted axially.

48. The combination according to claim 26 in which the last mentioned means comprises a ratchet and pawl mechanism including a cam cluster feather-keyed on a shaft rotated by the general operating mechanism, which cam cluster comprises a plurality of axially spaced cams of different conformation, and a cam operated member which may be operated by that one of said cams which is brought into line with said member by axial shifting of said cam cluster, whereby said cam operated member may be operated in a different manner in a shaft revolution depending upon which cam is in line therewith, together with a plurality of control keys the operation of which will cause said cam cluster to be differentially shifted axially and will cause the general operating mechanism to be operated.

49. The combination according to claim 35 in which the last mentioned means comprises a plurality of cams one of which may be made effective to advance said cam-responsive means or the other of which cams may be made effective to effect line spacing, said cams forming a cam cluster feather-keyed on a shaft rotated by the general operating mechanism together with two cam operated members one adapted to advance said cam-responsive means and the other adapted to cause line spacing, said two cam operated means being so positioned that when the cam cluster is in one axial position one of said cams operates the cam operated member to advance said cam-responsive means and when said cam cluster is in another position the other of said cams operates the cam operated member which causes line spacing, together with a plurality of manipulative control members the operation of any of which will axially shift said cam cluster.

50. The combination according to claim 35 in which the last mentioned means comprises a plurality of cams one of which may be made effective to advance said cam-responsive means or the other of which cams may be made effective to effect line spacing, said cams forming a cam cluster feather-keyed on a shaft rotated by the general operating mechanism together with two cam operated members one adapted to advance said cam-responsive means and the other adapted to cause line spacing, said two cam operated means being so positioned that when the cam cluster is in one axial position one of said cams operates the cam operated member to advance said cam-responsive means and when said cam cluster is in another position the other of said cams operates the cam operated member which causes line spacing, together with a plurality of manipulative control members the operation of any of which will axially shift said cam cluster and will cause the general operating mechanism to be operated.

51. The combination according to claim 26 in which the last mentioned means comprises a ratchet and pawl mechanism including a cam cluster feather-keyed on a shaft rotated by the general operating mechanism, which cam cluster comprises a plurality of axially spaced cams of different conformation, and a cam operated member which may be operated by that one of said cams which is brought into line with said member by axial shifting of said cam cluster, whereby said cam operated member may be operated in a different manner in a shaft revolution depending upon which cam is in line therewith, together with a plurality of control keys the operation of which will cause said cam cluster to be differentially shifted axially and will cause the general operating mechanism to be operated.

52. The combination according to claim 1 in which the cam means on the carriage which serves to position the cam-responsive controlling means to neutral comprises a plate having one end sloping to form a camming surface.

53. The combination according to claim 1 in which the cam means on the carriage which serve to position the cam-responsive means to neutral positions comprise a plurality of plates each having one end sloping to form camming surfaces.

54. The combination according to claim 1 in which the cam means on the carriage which serve to position the cam-responsive means to neutral positions comprise a plurality of plates each having one end sloping to form camming surfaces, said cam plates being supported on the carriage for adjustment in the direction of carriage movement, the adjacent cam plates being located in different planes so that they may be overlapped.

55. The combination according to claim 1 in which the cam means on the carriage which serve to position the cam-responsive means to neutral positions comprise a plurality of plates each having one end sloping to form camming surfaces, said cam plates overlapping each other, so that said plates form a continuous surface for cooperation with said cam-responsive means.

References Cited in the file of this patent

UNITED STATES PATENTS

| | | |
|---|---|---|
| 1,325,469 | Hart | Dec. 16, 1919 |
| 2,025,956 | Sagner | Dec. 31, 1935 |
| 2,088,662 | Ott et al. | Aug. 3, 1937 |
| 2,216,636 | Webb | Oct. 1, 1940 |
| 2,294,948 | Avery | Sept. 8, 1942 |
| 2,382,195 | Anderson | Aug. 14, 1945 |
| 2,442,402 | Davidson et al. | June 1, 1948 |
| 2,597,162 | Mehan et al. | May 20, 1952 |